Jan. 23, 1923.                                                  1,442,878
S. B. HASELTINE.
FRICTION SHOCK ABSORBING MECHANISM.
FILED MAY 26, 1920.
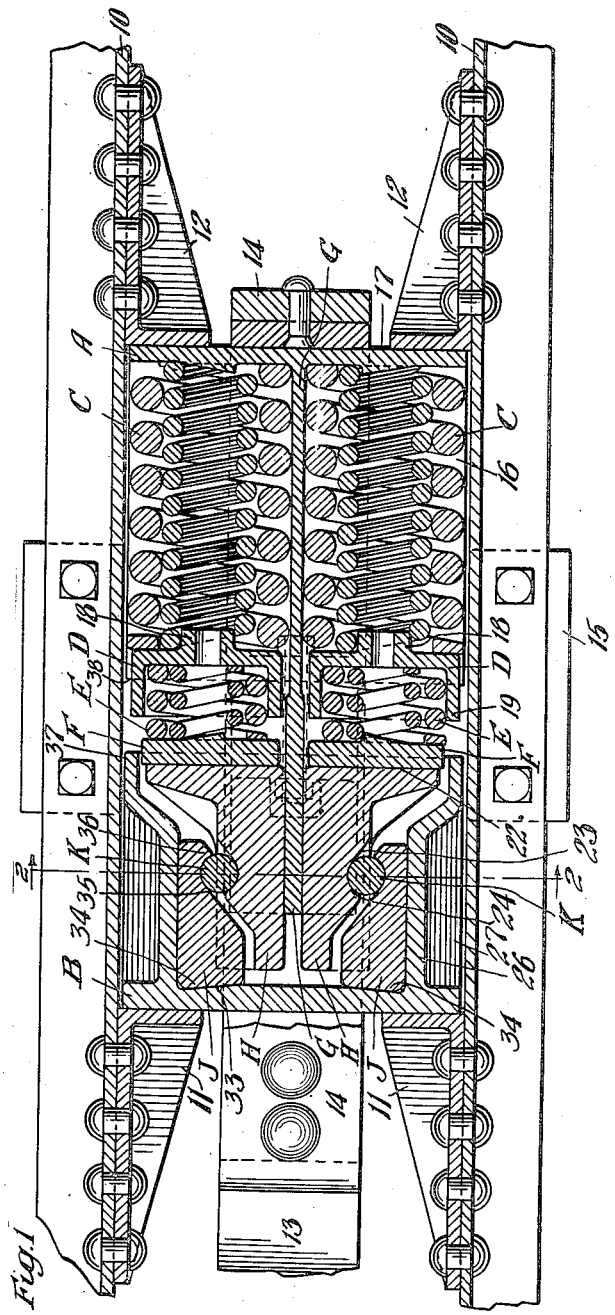
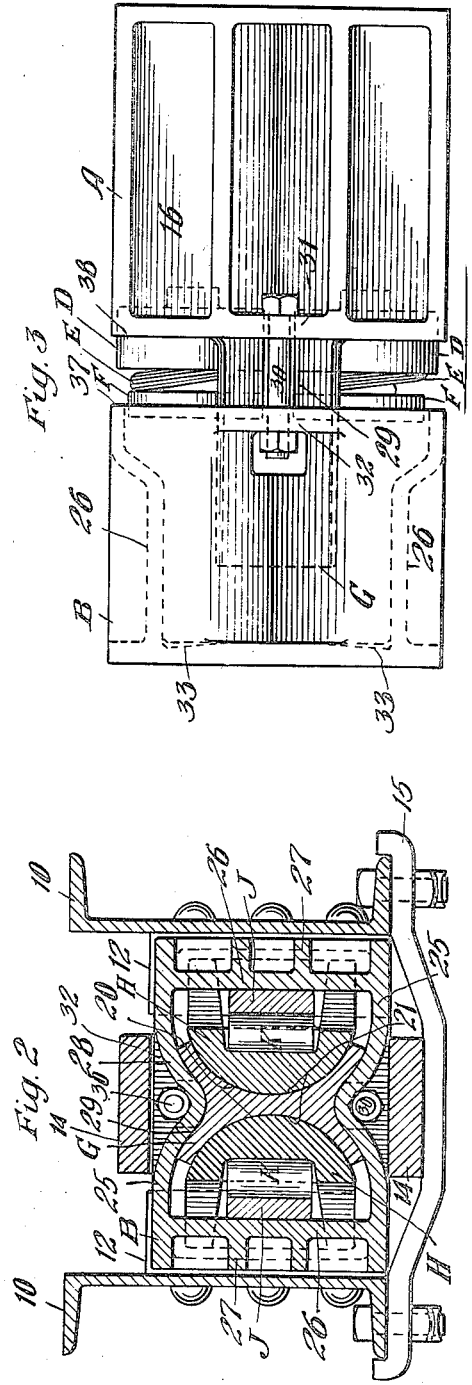
Witnesses
Wm. Geiger
Una C. Grigsby
Inventor
Stacy B. Haseltine
By Geo. I. Haight
His Atty.

Patented Jan. 23, 1923.

1,442,878

UNITED STATES PATENT OFFICE.

STACY B. HASELTINE, OF CHICAGO, ILLINOIS, ASSIGNOR TO WILLIAM H. MINER, OF CHAZY, NEW YORK.

FRICTION SHOCK-ABSORBING MECHANISM.

Application filed May 26, 1920. Serial No. 384,328.

*To all whom it may concern:*

Be it known that I, STACY B. HASELTINE, a citizen of United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

The object of the invention is to provide a friction shock absorbing mechanism of high capacity, efficient operation, long life and easy graduated action, the shock absorbing mechanism being especially adapted for railway draft riggings.

In the drawings forming a part of this specification, Figure 1 is a longitudinal horizontal sectional view of a portion of a railway draft rigging showing my improvements in connection therewith. Figure 2 is a vertical transverse sectional view taken substantially on the line 2—2 of Figure 1. And Figure 3 is a top plan view of the shock absorbing mechanism proper.

In said drawing 10—10 denote channel shaped center or draft sills of a railway car to the inner faces of which are secured front lugs 11 and rear lugs 12, the same being spaced the standard distance apart. A portion of a draw bar is indicated at 13, the same having riveted thereto a yoke 14 of well known form. The shock absorbing mechanism proper and yoke are adapted to be supported by a detachable saddle plate 15.

The improved shock absorbing mechanism, as shown, comprises, broadly, a heavy spring cage or casing A; a front follower cage B, twin arranged main springs C—C; spring followers D—D; a pair of preliminary springs E—E; followers F—F; a central friction post or stem G; a pair of friction shoes H—H; a pair of wedges J—J; and a pair of anti-friction rollers K—K.

The spring cage A is in the form of a heavy casting having top and bottom walls 16—16 and an integral rear wall 17, the latter being adapted to act as the rear follower in conjunction with the stops 12. The friction stem or post G is preferably formed integrally with the spring cage A and is extended forwardly of the walls 16 thereof, as clearly indicated in Figure 1. The details of the post G will be described hereinafter.

The post G is located centrally of the cage A so as to divide the latter, in effect, into two chambers suitable to accommodate the two main springs C—C in horizontal twin arrangement, as shown in Figure 1. The followers D—D bear against the front ends of the springs C, the rear ends of the springs bearing against the rear wall 17. Each of said followers D is of hollow cup-shaped form so as to provide a pocket or recess to accommodate the preliminary springs E. In addition, each follower D is provided with a rearwardly extended boss 18 arranged to extend within the inner coil of the corresponding main spring so as to maintain the follower D in proper position as will be understood. The followers F bear against the front ends of the corresponding preliminary springs E and each of said followers F is of heavy disc-like form and so arranged that they are normally spaced from the forward edges 19 of the corresponding followers D, a distance equal to the desired preliminary action, as hereinafter described. Said followers F overlap the edges of the flanges of the followers D so as to actuate the latter after the preliminary springs E have been compressed to the desired extent.

The friction post or stem G, forwardly of the walls of the spring cage A, is made of substantially concavo-concave cross section as shown in Figure 2, that is, the stem is concaved on each side thereof symmetrically with respect to a vertical central plane. Said concave surfaces indicated at 20 constitute longitudinally extending friction surfaces and by making them as described, it is evident that I obtain a relatively large wearing area considering the permissible vertical height of the shock absorbing mechanism which must be contained within the arms of the yoke. The friction shoes H are formed on their inner faces with correspondingly convex friction surfaces 21, each shoe being provided at its inner end with a transversely extending face 22 adapted to act as an abutment against the corresponding follower F. On its outer side, each shoe H is provided with a wedge surface 23 and a roll shoulder or seat 24.

The follower cage B is of generally rectangular outline and has upper and lower walls 25—25 and side walls 26—26, the latter being suitably braced on their outer sides by strengthening ribs 27—27. The upper and lower walls 25 of said follower cage are curved inwardly as indicated at 28 to fit corresponding longitudinally extending grooves 29 in the upper and lower faces of the friction post G. In this manner, the proper alinement between the follower cage and friction post is maintained and also ample clearance is given for the two retainer bolts 30—30 which pass through flanges 31 and 32 on the cage A and cage B, respectively, as clearly shown in Figure 3. As will be evident, the function of the bolts 30 is to retain the parts in assembled relation and also, if desired, to place the springs under an initial compression. The interior of the follower cage B is made to accommodate the two wedges J—J and preferably there will be inclined faces 33 on the interior of the cage to correspond with the plainly beveled ends 34 of the wedges J.

The wedges J are formed with wedge surfaces 35 parallel and opposed to the wedge surfaces 23 of the shoes, it being evident that the anti-friction rollers K are interposed between the sets of wedge surfaces 23 and 35. Each wedge J is also provided with a shoulder or roll seat 36 opposed to the corresponding shoulder 24 on the friction shoe. By making the wedges J separate or detachable from the cage B, the manufacturing costs are reduced and renewals may be effected at minimum expense. The inner edge of the cage B as indicated at 37 is left forward of the inner faces of the followers F so as not to interfere with the follows F coming into contact with the followers D. This is fully shown in Figure 1. Said edge 37 is however, made in alinement with the forward edges 38 of the top and bottom wall 16 of the spring cage A so that, upon completion of the permissible stroke, the cage B will come into contact with the cage A and a very strong column obtained for the transmission of the ultimate blows to the stops of the rigging.

In operation and assuming a buffing movement, the follower cage B will move rearwardly thus forcing the wedges J rearwardly in unison therewith. As the wedges J travel rearwardly pressure is transmitted therefrom through the anti-friction rollers K to the shoes H and they in turn are compressed into tight frictional gripping engagement with the post or stem G. Due to the fact that the main springs C are of heavier or of greater capacity than the preliminary springs E, the first part of the compressive stroke will be taken up in the springs E and until the followers F and D come into engagement. Thereafter, the main springs C will afford the yielding resistance between the shoes H and the friction post or stem and spring cage. In release, due to the anti-friction rollers K, there will be sufficient motion between the wedges J and shoes H as to relieve the latter of the enormous compressing forces that are set up during the compressive stroke and hence the release is made certain.

By employing the curved sets of friction surfaces 20 and 21, it will be seen that variations or irregularities in the inclination of the wedge surfaces 23 and 35 with respect to a vertical plane will be automatically compensated for since the shoes can adjust themselves circularly with respect to the stem or post G. This is of importance since it permits of reduced cost in the manufacture and eliminates some of the refinements of finishing that might otherwise be required.

In this connection it will be noted that there are no interfitting ribs and grooves on the shoes and posts to in anywise interfere with such shifting of the shoes circularly with respect to the friction post.

Although I have herein shown and described what I now consider the preferred manner of carrying out the invention, the same is merely illustrative and I contemplate all changes and modifications that come within the scope of the claims appended hereto.

I claim:

1. In a friction shock absorbing mechanism, the combination with a casing having spaced upper and lower, horizontal parallel walls united by an integral transverse wall and a central partition extending from said transverse wall between and united to said parallel walls and outwardly beyond the free ends of the latter, said partition, at its extended outer end having friction surfaces thereon; of friction shoes slidable on said surfaces; wedging means cooperable with said shoes to force them inwardly against said first named friction surfaces and longitudinally thereof; and horizontal twin arranged spring means for yieldingly resisting movement between said shoes and said casing.

2. In a friction shock absorbing mechanism, the combination with a casing having integrally formed spaced horizontal parallel top and bottom walls, vertical end wall, and a longitudinally extending centrally disposed partition dividing said casing into twin chambers, said partition being extended outwardly beyond the free ends of said top and bottom walls and formed with longitudinally extending friction surfaces; a pair of springs longitudinally arranged in the same horizontal plane, and one of said springs in each of said chambers; friction shoes cooperable with said friction surfaces and yieldingly resisted by said springs; and a wedge follower cooperable with said shoes to actuate them longitudinally with respect to said casing.

3. In a friction shock absorbing mechanism, the combination with a casing having integrally formed spaced parallel top and bottom walls, vertical end wall, and a longitudinally extending centrally disposed partition dividing said casing into twin chambers, said partition being extended outwardly beyond the free ends of said top and bottom walls and formed with longitudinally extending friction surfaces; a longitudinally arranged spring in each of said chambers; friction shoes cooperable with said friction surfaces and yieldingly resisted by said springs; and a wedge follower cooperable with said shoes to actuate them longitudinally with respect to said casing, said wedge follower substantially enclosing the friction shoes and adapted to engage the casing to limit the compression stroke of the mechanism, the casing acting as a column to withstand ultimate shocks.

4. In a friction shock absorbing mechanism, the combination with a casing having integrally formed spaced parallel top and bottom walls, vertical end wall and a longitudinally extending centrally disposed partition dividing said casing into twin chambers, said partition being extended outwardly beyond the free ends of said top and bottom walls and formed with longitudinally extending friction surfaces; a longitudinally arranged spring in each of said chambers; friction shoes cooperable with said friction surfaces and yieldingly resisted by said springs; a wedge follower cooperable with said shoes to actuate them longitudinally with respect to said casing; and bolts extending between said casing and wedge follower, limiting the relative separation thereof.

5. In a friction shock absorbing mechanism, the combination with a casing having spaced parallel walls united by an integral transverse wall and a central partition extending from said transverse wall between and united to said parallel walls and outwardly beyond the free ends of the latter, said partition, at its extended outer end, having a concavo-concave cross-section, the concave faces forming friction surfaces thereon; of friction shoes co-operable with said partition, each shoe having a convex surface slidably co-operable with a concave surface of said partition; wedging means co-operable with said shoes to force them inwardly against said first named friction surfaces and longitudinally thereof; spring means arranged on opposite sides of said partition for yieldingly resisting movement between said shoes and said casing; and a wedge follower co-operable with said wedging means to actuate said wedging means and shoes longitudinally with respect to the casing, said follower substantially enclosing the wedging means and friction shoes and adapted to engage the casing to limit the compression stroke of the mechanism.

6. In a friction shock absorbing mechanism, the combination with a casing having spaced parallel walls united by an integral transverse wall and a central partition extending from said transverse wall between and united to said parallel walls and outwardly beyond the free ends of the latter, said partition, at its extended outer end, having a concavo-concave cross-section, the concave faces forming friction surfaces thereon; of friction shoes co-operable with said partition, each shoe having a convex surface slidably co-operable with a concave surface of said partition; wedging means comprising a plurality of individual wedges co-operable with said shoes to force them inwardly against said first named friction surfaces and longitudinally thereof; anti-friction rollers interposed between the wedges and shoes; a main spring resistance; a preliminary spring resistance; followers interposed between said main and preliminary spring resistance; followers interposed between said preliminary spring resistance and said shoes, the last named followers being normally spaced from the first named followers and adapted to engage the latter upon compression of the preliminary spring resistance; and a wedge follower detachably receiving said wedges and co-operable therewith to actuate said wedges and said shoes longitudinally with respect to the casing, said follower substantially enclosing the wedges and friction shoes and adapted to engage the casing to limit the compression stroke of the mechanism.

In witness that I claim the foregoing I have hereunto subscribed my name this 20th day of May, 1920.

STACY B. HASELTINE.

Witness:
CARRIE GAILING.